J. J. SMITH.
DEVICE AND MECHANISM FOR DEPOSITING COATING UPON FOOD PRODUCTS.
APPLICATION FILED OCT. 17, 1919.
1,346,270. Patented July 13, 1920.
2 SHEETS—SHEET 1.
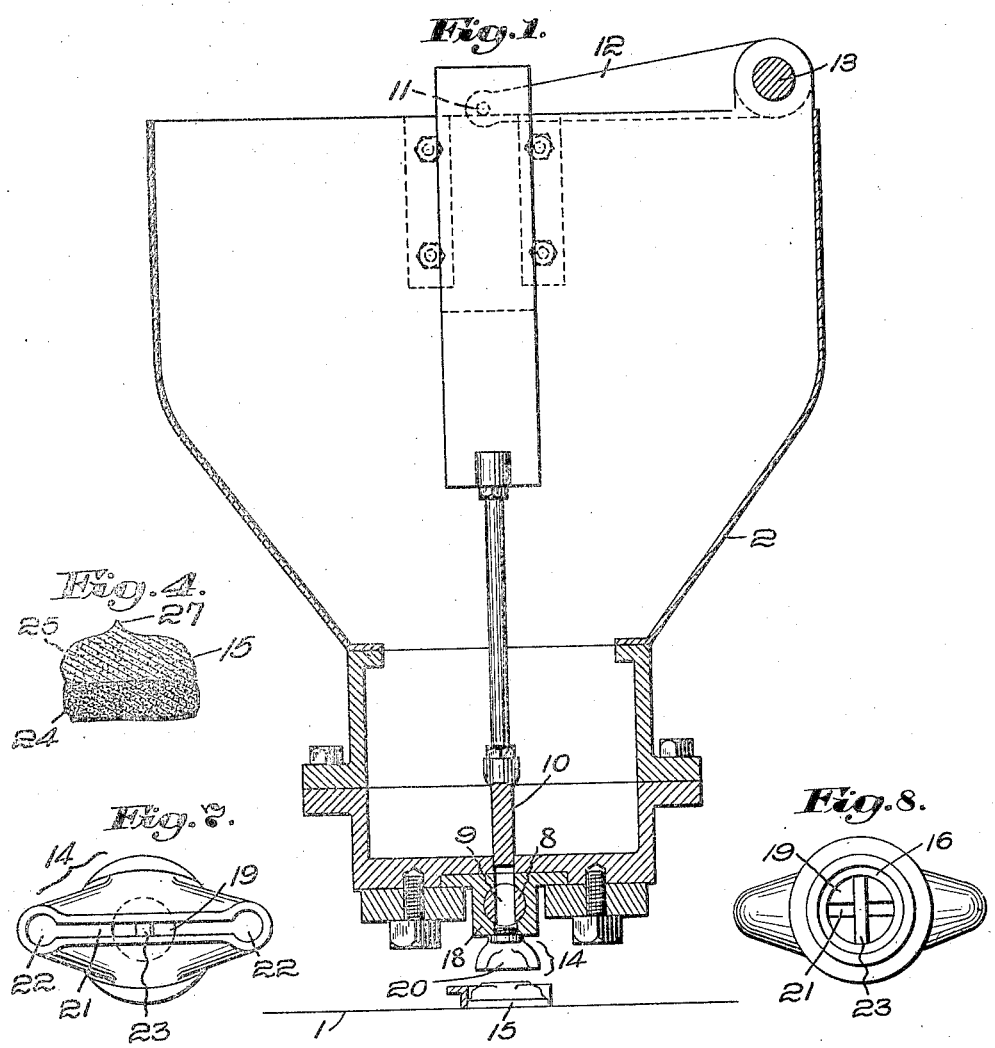
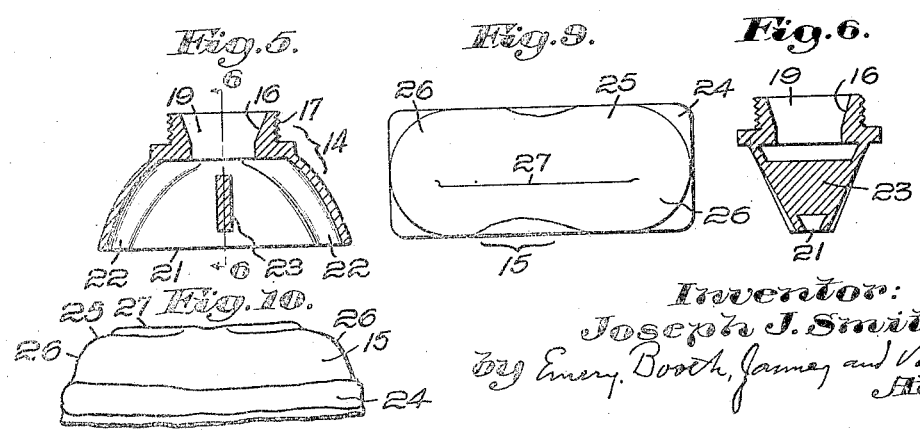
Inventor:
Joseph J. Smith,
By Emery, Booth, Janney and Varney
Attys.

J. J. SMITH.
DEVICE AND MECHANISM FOR DEPOSITING COATING UPON FOOD PRODUCTS.
APPLICATION FILED OCT. 17, 1919.
1,346,270.
Patented July 13, 1920.
2 SHEETS—SHEET 2.
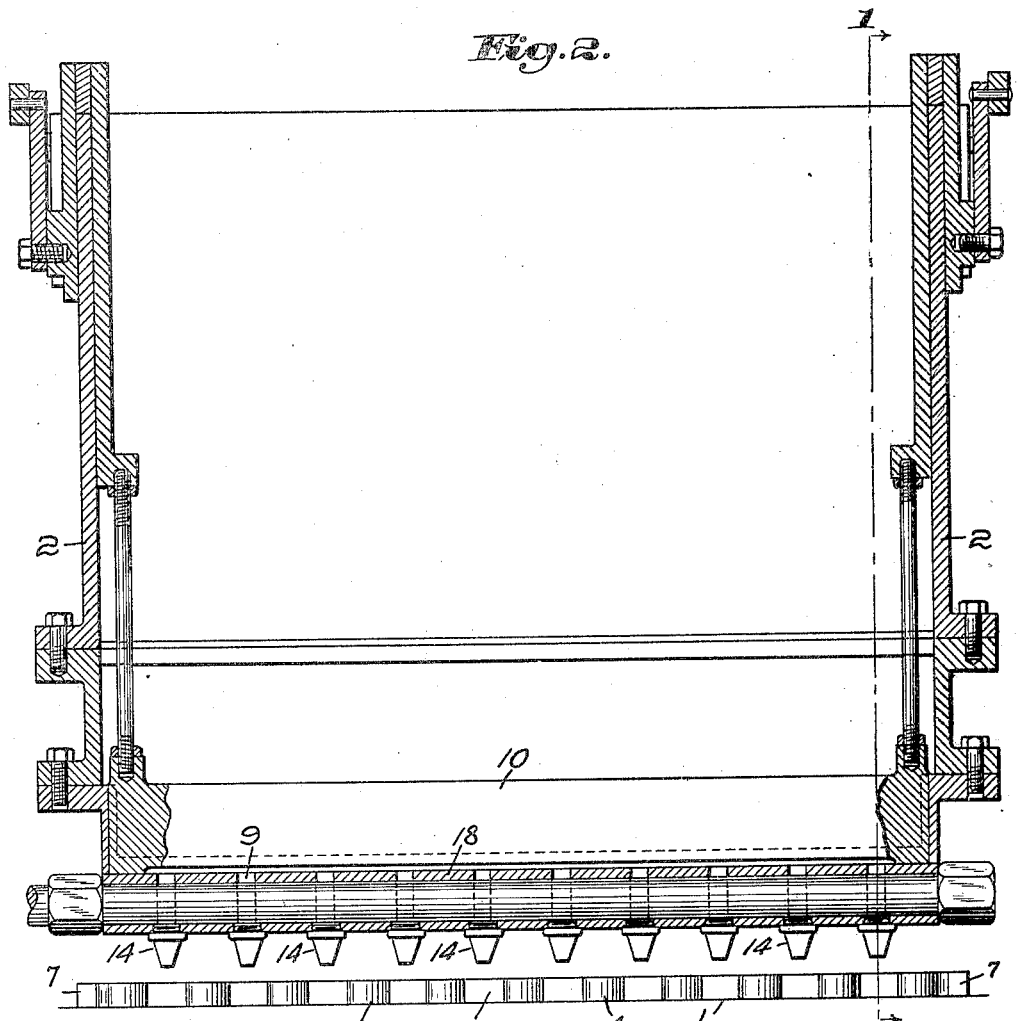
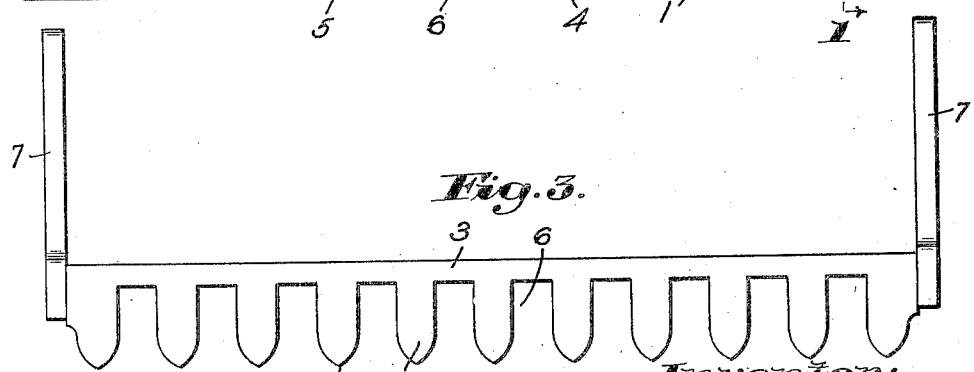

UNITED STATES PATENT OFFICE.

JOSEPH J. SMITH, OF DORCHESTER, MASSACHUSETTS, ASSIGNOR TO LOOSE WILES BISCUIT COMPANY, OF LONG ISLAND CITY, NEW YORK, N. Y., A CORPORATION OF NEW YORK.

DEVICE AND MECHANISM FOR DEPOSITING COATING UPON FOOD PRODUCTS.

1,346,270.  Specification of Letters Patent.  Patented July 13, 1920.

Application filed October 17, 1919. Serial No. 331,269.

*To all whom it may concern:*

Be it known that I, JOSEPH J. SMITH, a citizen of the United States, and a resident of Dorchester, in the county of Suffolk and State of Massachusetts, have invented an Improvement in Devices and Mechanism for Depositing Coating upon Food Products, of which the following description, in connection with the accompanying drawings, is a specification, like characters on the drawings representing like parts.

This invention relates to devices and mechanism for depositing coating upon food products and the like.

In order that the principle of the invention may be readily understood, I have in the accompanying drawings shown a single embodiment of means for depositing coating upon food products.

In said drawings,—

Figure 1 is a vertical longitudinal section through a hopper or receiver for the coating material and parts associated therewith and representing coating material deposited upon one of the food products;

Fig. 2 is a vertical transverse section taken through the said hopper and associated parts and representing in end elevation the nozzles or so-called dies through which the material is deposited;

Fig. 3 is a plan view of a portion of one of the placers for positioning the food products for receiving the coating material;

Fig. 4 is a vertical transverse section through the food product;

Fig. 5 is a vertical longitudinal section taken through one of the nozzles or so-called dies;

Fig. 6 is a vertical transverse section taken therethrough;

Fig. 7 is an underneath plan view thereof;

Fig. 8 is a top plan view of the nozzle detached from the rest of the mechanism.

Fig. 9 is a plan view of one of the food products constructed in accordance with my invention and of substantially full size; and Fig. 10 is a side elevation of such food product.

Food products, such as cakes and the like, have heretofore had coating material deposited thereon mechanically and such food products have been of various shapes including circular and elongated or of the so-called finger or lady finger type. My invention comprehends novel means for depositing coating upon food products of such elongated or finger shape.

Obviously my invention may be practised by means operated partially by hand, as by employing the so-called hand bag to which a suitable nozzle is attached. I have, however, chosen to illustrate the use of the proper shape nozzle in connection with a coating machine generally similar to that disclosed in the patent to Edward Legler, No. 1,260,558, March 26, 1918, wherein is disclosed means for depositing jelly upon a food product. In the said Legler patent means are disclosed for pushing cakes or like products from a hopper or receptacle onto a traveling belt. Such means are preferably employed in connection with or as a part of the mechanism herein disclosed, but I have not illustrated herein such means in detail, since the cakes or other products may be deposited in any suitable manner upon the apron or other conveyer.

While any suitable conveyer may be employed, I preferably provide an apron or belt 1 which is supported upon a suitable framing, not herein shown. Preferably the apron which is endless is of very considerable length and the cakes or other products carried thereby and treated while thereon are discharged in a manner not herein represented. The cakes or the like having been suitably deposited or positioned upon the belt 1, which is preferably intermittently driven as described in the said Legler patent, are preferably by a pusher or placer moved under a suitable hopper or receptacle 2 containing the coating of whatever character, as more fully disclosed in said patent. Instead of providing a placer or pusher of the shape shown in said patent and which is adapted for use in connection with circular products, I employ a placer of the form represented at 3 in Figs. 2 and 3. Therein I have represented a transverse member having forwardly extending projections 4 preferably pointed, as indicated at 5, and between which are open-ended recesses 6 of general oblong shape and conforming substantially to the shape of the food product upon which the coating is to be placed. The said pusher or placer is connected at its ends to longitudinally extending rods or bars 7 which may be operated in the general manner shown in the said Legler patent.

The coating material of whatever nature is received within the hopper or receptacle 2, which is provided in its bottom with a valve 8 here shown as a shaft adapted to be rotated intermittently in one direction and provided with a series of through openings 9 for the delivery for the material. Positioned above the shaft 8 and adapted to be reciprocated in suitable guide ways in the end walls of the hopper or receptacle 2 is a plunger 10 pivotally connected at 11 to a lever arm 12 upon a rock shaft 13 operated in any suitable manner, as, for example, by means shown in the said Legler patent. In this or in any other suitable manner, the coating material within the hopper or receptacle 2 is forced through the openings in the valve 8 when said valve is in the open position indicated in Fig. 1.

Communicating with the openings through the valve 8 is preferably a series of nozzles or so-called dies 14 through which the coating material is deposited upon the food products, one of which is indicated generally at 15 in Figs. 1, 4, 9 and 10.

Heretofore such nozzle has been provided merely with an opening circular in cross section. I have, however, provided means whereby the coating material is deposited upon an elongated product in a substantially even manner from end to end thereof.

It has heretofore been proposed to deposit a coating upon an elongated food product, but so far as I am aware only by some manually manipulated device that has been moved from end to end of such product. In Figs. 5, 6 and 7, I have represented the preferred form of nozzle or so-called die. Therein it is shown as having a neck 16 threaded as indicated at 17 for attachment to the block or plate 18 wherein the valve 8 is positioned. The said nozzle is of an elongated form, as most clearly represented in Figs. 1, 7 and 8. As appears from said figures, the opening 19 into the nozzle is preferably, though not necessarily, circular. The body portion 20 of the nozzle is, however, substantially flattened. The discharge slot 21 is preferably enlarged at its ends 22, as indicated in Figs. 5 and 7. This enlargement may be a somewhat gradual one from or near the center toward and to the ends, but preferably it is substantially an abrupt enlargement at each end, as indicated at 22. Preferably also the said nozzle is provided interiorly with means for dividing the flow of the coating material and directing it toward the two ends of the nozzle. For such purpose I have herein represented a partition 23, herein shown as integral with the body of the nozzle and vertically positioned so as to direct the flow toward the two ends of the nozzle. The said partition or directing means may partake of various forms.

In Figs. 4, 9 and 10, I have represented the completely coated food product 15. It is there shown as consisting of the base 24 composed of cake or the like, and the coating substance 25 having substantially rounded ends 26 and a well defined ridge 27 extending lengthwise of the food product nearly from end to end thereof and giving a characteristic appearance thereto and serving also as a reinforcement. Such ridge is of mechanical advantage as a reinforcement when the food products are packed one upon another in a receptacle for shipment. It will be observed from a comparison of Figs. 9 and 10 that the surface of the coating material is generally rounded excepting where the ridge 27 is provided.

Through much experimentation I have ascertained that if an elongated nozzle be provided without enlargements at the ends thereof the material will be unequally distributed over the surface of the food product. That is to say, the coating will be deposited in sufficient abundance midlength of the food product but more thinly at the ends and so as to give a pointed effect.

If desired and within the scope of my invention, the nozzle of the general type or form herein represented may be employed with mechanisms other than that shown herein and may also be employed with a so-called hand bag for mechanical application of the coating material to the food product.

Having thus described my invention, I desire it to be understood that although specific terms are employed, they are used in a generic and descriptive sense and not for purposes of limitation, the scope of the invention being set forth in the following claims:

1. A device for applying coating to food products consisting of a discharge member having an elongated discharge opening that is open from end to end, said member being provided interiorly with means for directing the flow of the material toward both ends of said elongated discharge opening.

2. A device for applying coating to food products consisting of a discharge member having an elongated discharge opening that is open from end to end, said opening having enlargements at its ends, said member being provided interiorly with means to direct the flow of the material toward both enlargements.

3. A device for applying coating to food products consisting of a discharge member having an elongated discharge opening which is open from end to end and has enlargements at its opposite ends, whereby fluent material may be discharged in an unbroken mass throughout the length of the discharge opening.

4. Mechanism for depositing coating upon food products comprising a hopper or receptacle for coating material, valve means for discharging the coating material, and a series of discharge nozzles in communication with said valve, each of said nozzles having a discharge opening open from end to end, and having enlargements at said ends, whereby the coating material may be discharged in an unbroken mass throughout the length of said opening.

5. Mechanism for depositing coating upon food products comprising a hopper or receptacle for coating material, valve means for discharging the coating material and a series of discharge nozzles in communication with said valve, each of said nozzles having an elongated discharge opening which is enlarged at its oposite ends and is uninterrupted between said ends.

6. Mechanism for depositing coating upon food products comprising a hopper or receptacle for coating material, valve means for discharging the coating material, and a series of discharge nozzles in communication with said valve, each of said nozzles having an elongated discharge opening uninterrupted from end to end, each of said nozzles also being provided interiorly with means to direct the flow of the material toward both ends.

7. A device for applying coating to food products consisting of a discharge member 14 having an elongated discharge opening 21 provided with enlarged ends 22—22, which are in uninterrupted communication with each other, the said device having a member 23 to direct the material toward opposite ends of the said opening, and means to eject the material through said discharge opening 21.

In testimony whereof, I have signed my name to this specification.

JOSEPH J. SMITH.